May 14, 1940.  A. C. DAVIS  2,201,123
CONTROL SYSTEM
Filed July 1, 1939  2 Sheets-Sheet 1
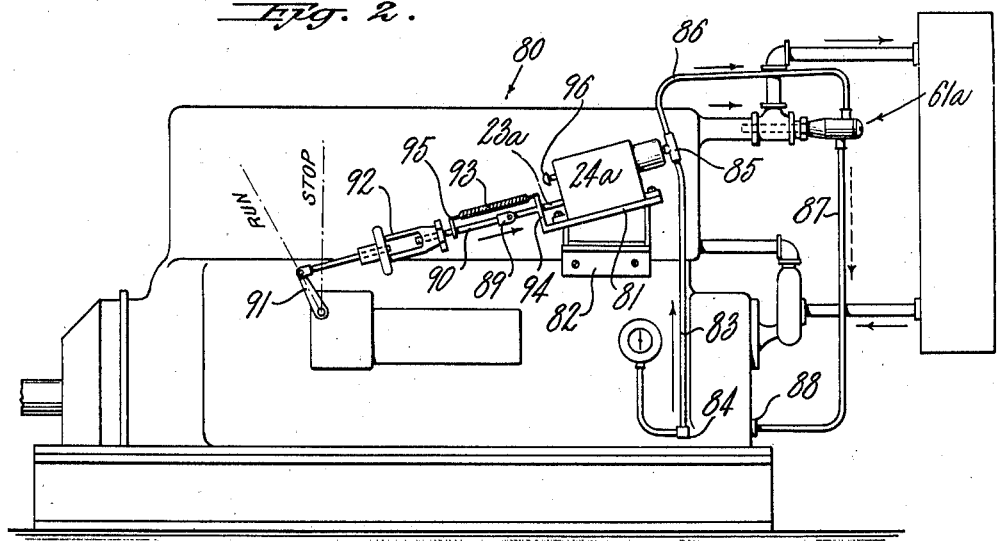
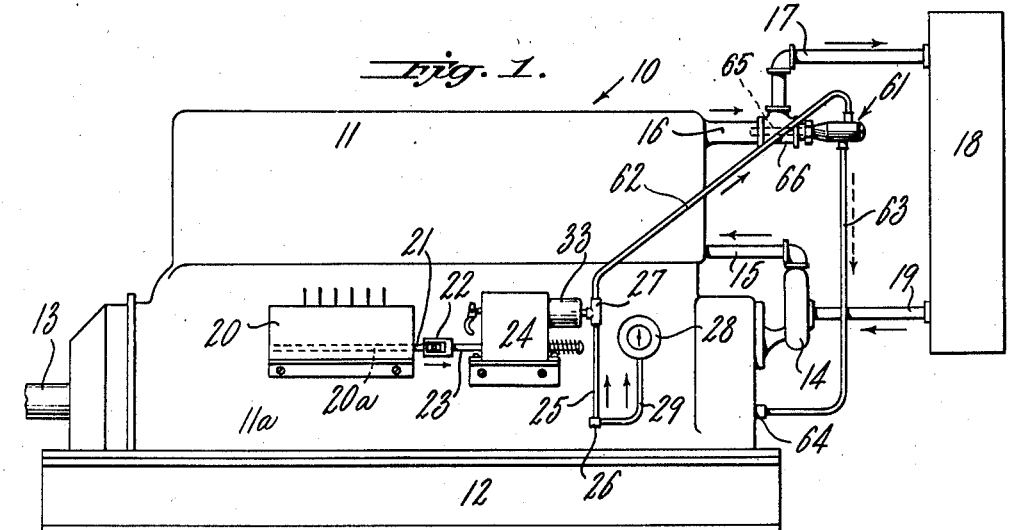
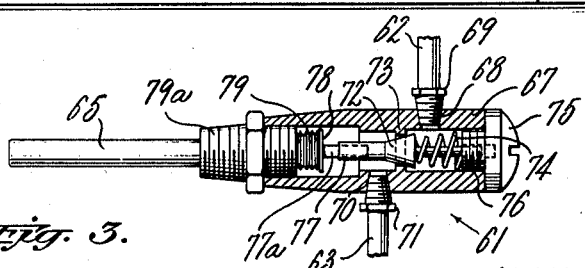
INVENTOR.
ALAN C. DAVIS
BY
ATTORNEY.

May 14, 1940.                A. C. DAVIS                 2,201,123
                            CONTROL SYSTEM
                         Filed July 1, 1939          2 Sheets-Sheet 2
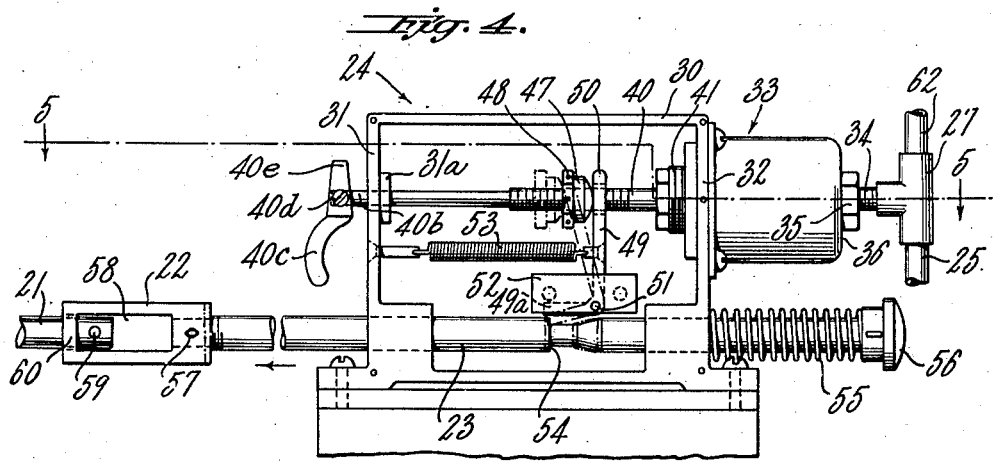
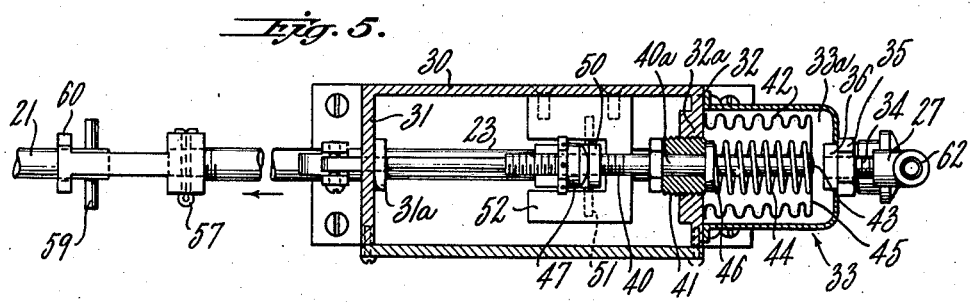
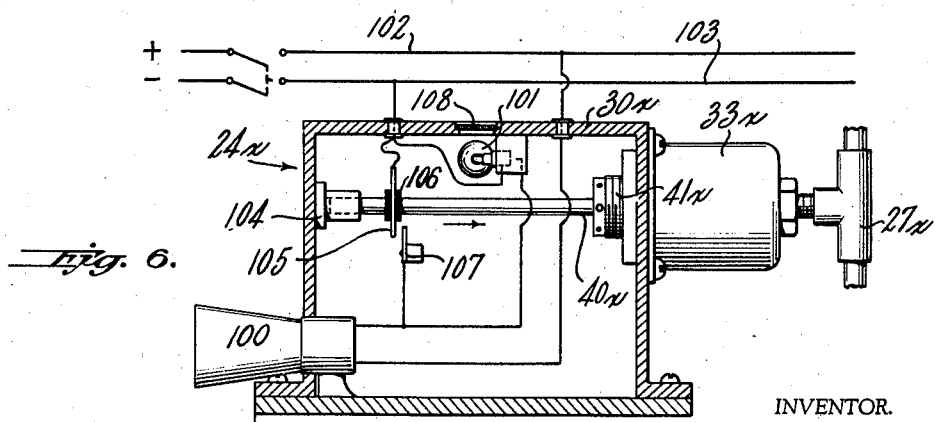
INVENTOR.
ALAN C. DAVIS
BY
Alan D. Redfield
ATTORNEY.

Patented May 14, 1940

2,201,123

UNITED STATES PATENT OFFICE 2,201,123

CONTROL SYSTEM

Alan C. Davis, New York, N. Y., assignor to Viking Instruments, Inc., Stamford, Conn., a corporation of New York Application July 1, 1939, Serial No. 282,407

5 Claims. (Cl. 123—198)

This invention relates to engines of the type depending upon pressure lubrication. The invention is particularly concerned with internal combustion engines of the Diesel type and control systems therefor by which abnormal or dangerous conditions, such as an undue decrease in the pressure in the lubricating oil system or increase in temperature of the cooling fluid system, are utilized to produce a mechanical movement adapted to perform some function such as shutting down the engine, or giving an alarm.

Systems of this nature that have heretofore been proposed are either electrical or mechanical. Electrical systems entail high initial cost and complicated mechanism and are objectionable in that failure of electric power vitiates the system.

Mechanical systems utilize pressure-operated, pressure-responsive means and pressure-operated, temperature-responsive means, both of which are connected to a control mechanism, operable upon decrease in lubricating oil pressure or increase in temperature in the cooling fluid system. Such control systems require a capillary tube for connecting the pressure-operated element of the temperature actuated part of the control, to the temperature-responsive bulb installed in the cooling fluid system.

The use of such capillary tubes is undesirable for several reasons. The capillary tube system must be vacuum tight, which condition is difficult to maintain in that the joints and relatively long sections of small diameter tubing increase the likelihood of damage due to vibration. Also, carelessness by operating personnel may cause damage to the necessarily exposed capillary system.

The present invention overcomes these difficulties and provides a very simple, direct- and positively-acting mechanical control for engines of the type described, eliminating the necessity for capillary tubing in the temperature-actuated parts of the system. The invention further provides a single pressure-operated, pressure-responsive device in a pressure lubrication system in which are provided one or more valves directly responsive to a predetermined condition and thereby adapted to be opened to by-pass the lubricating oil back into the crank case of the engine and thereby to lower the pressure sufficiently to operate the pressure-responsive device. The by-pass valves may be made responsive to temperature changes in the fluid circulation system of the engine or to changes in the oil pressure or fluid circulation system of some other engine, or it may be made responsive to one or more of a variety of other conditions.

The novel features that I consider characteristic of my invention are set forth in the appended claims. The invention itself, however, both as to its organization and its method of operation, together with additional objects and advantages thereof, will best be understood from the following description of specific embodiments, when read in connection with the accompanying drawings, in which—

Fig. 1 is a side elevation of an internal combustion engine in which the principles of the invention may be utilized;

Fig. 2 is a similar view showing a modified way in which the principles of the invention may be utilized;

Fig. 3 is a sectional view of a thermostatic bypass valve such as may be used in the illustrative structures of Figs. 1 and 2;

Fig. 4 is a side elevation with cover removed of a means for producing mechanical movement when a reduction in pressure occurs in the lubricating system of an engine;

Fig. 5 is a section taken on the line 5—5 of Fig. 4; and

Fig. 6 is a sectional view of a slightly modified form of device for producing mechanical movement upon a decrease of pressure in the lubricating system, and showing how this movement may be utilized in a different way from that illustrated in the preceding figures.

Referring to Fig. 1, the control system of the invention may be adapted for use with an engine 10 comprising a cylinder head 11, crank case 11ª, base 12, crank shaft 13, and cooling fluid circulating pump 14. The latter may be of the centrifugal type, designed to circulate the cooling fluid through line 15, the water jackets of the engine, lines 16 and 17, heat exchanger 18, and back to the pump through line 19. The engine has a fuel pump 20 of the usual type and may have a rack 20ª to which is secured an extension 21. The end of extension 21 carries a pin 59 which co-operates with a fitting 22, attached to control rod 23 of pressure-responsive device 24, in such manner that the extension may oscillate with the rack when the pump is in operation. When the rod 23 of pressure-responsive device 24 is moved in the direction of the arrow in Fig. 1, the rack extension is similarly moved and the injection valves of the engine closed.

A line 25 is tapped into the crank case at a suitable point 26 in the high pressure side of the lubricating oil system of the engine, and connected to pressure-responsive device 24 through T fitting 27. A gauge 28 connected to 26 by line 29 may be used to obtain a visual indication of the pressure in the system.

Pressure-responsive device 24 is illustrative of one type that may be used in applying the principles of the invention, and is shown in detail in Figs. 4 and 5. The same may consist of a casing 30 having end walls 31 and 32, which latter carries a bellows unit 33 connected by nipple 34 to the T fitting 27 in the lubricating pressure line. To nipple 34 may be threaded a nut 35, in turn secured to the end wall 36 of bellows unit 33.

Extending longitudinally of the casing 30 is a shaft 40, one end 40ᵃ of which is slidably mounted in member 41 threaded in boss 32ᵃ of wall 32, and the other end 40ᵇ of which is slidably mounted in boss 31ᵃ on end wall 31. To the end wall 32 within bellows unit 33 is secured a bellows 42, the end 45 of which is secured to the shaft 40 as at 43. The end of shaft 40 is encircled by a spring 44 abutting against end wall 45 of the bellows, and slidable collar 46 on the shaft. Adjustment of the threaded member 41 in boss 32ᵃ alters the degree of compression exerted on spring 44 so that a greater or less pressure within space 33ᵃ of unit 33 will collapse the bellows against the force of the spring and cause shaft 40 to be moved outwardly toward wall 31.

Intermediate the shaft 40 is an abutment 47 which may be secured to a threaded nut 48 arranged to engage complementary threads in the shaft 40 for adjustment in a longitudinal direction. A latch 49 having an apertured end 50 disposed against the abutment 47 is pivoted at 51 in a bracket 52 secured to the casing 30. A spring 53 may be secured to the latch 49 and to the end 31 of the casing in order to pull the latch against the abutment 47. Shaft 40 carries a dog 40ᶜ pivoted at 40ᵈ and having an end 40ᵉ adapted to be brought into contact with wall 31 of casing 30.

The lower end 49ᵃ of the latch is adapted to be depressed when the latch is turned on its pivot 51 so that the end 49ᵃ abuts against a shoulder 54 of rod 23, one end of which is provided with a spring 55 adapted to be compressed between wall 32 and a cap 56 secured to the end of rod 23. The spring construction is such that when the shaft 23 is moved in the direction of the arrows in Figs. 4 and 5, the movement is resisted by spring 55.

The fitting 22 may be screwed to shaft 23 and locked by pin 57. The fitting is preferably constructed so that it has an open space 58 in which pin 59 on shaft 21 may oscillate while the fuel pump is adjusting itself to varying loads.

The construction of the illustrative pressure-responsive device 24 is such that the normal pressure in the lubricating system will act through line 25 and T 27 on bellows 42, forcing the bellows inwardly against spring 44 and pushing shaft 40 and abutment 47 toward end wall 31. Spring 53 maintains the upper end 50 of latch 49 against abutment 47 so that the lower end 49ᵃ locks against shoulder 54 of rod 23, thus allowing the fuel pump rack to assume a number of operative positions defined by the length of opening 58 in fitting 22. A drop in the pressure causes bellows 42 to expand, abutment 47 to move toward wall 32 against the end 50 of the latch 49, throwing the other end 49ᵃ out of engagement with shoulder 54 so that the control rod 23 is moved in a direction opposite to that of the arrows in Figs. 4 and 5 under the action of spring 55. The end 60 of fitting 22 engages pin 59 in extension 21 and pulls the fuel pump rack to a position where the injection valves of the engine are closed.

In order to make the system described above responsive to other conditions, such as an undue rise in the temperature of the cooling water of the engine, a thermostatic by-pass valve 61 is inserted in the lubrication system as between line 62, connected to fitting 27 and line 63, leading back to a low pressure point in the crank case as at 64. Device 61 contains a temperature-sensitive element 65 which is extended into the cooling fluid circulation system as through the end of the T fitting 66.

The thermostatic by-pass valve may be of any desired construction. For instance, it may be made as shown in Fig. 3 so that it consists of a casing 67 having an inlet orifice 68 into which is threaded bushing 69 for connecting line 62 thereto, and an outlet orifice 70 provided with bushing 71 for connecting line 63 thereto. Within the casing 67 is a valve 72, adjustably held against a seat 73 by a spring 74, the end of which is held by a cap 75 threaded into the casing as at 76. Valve 72 is disposed on a shaft 77 into which extends pin 77ᵃ secured to a flange 78 carrying bellows 79 connected through fitting 79ᵃ to the temperature-sensitive element 65 which may consist of a closed bulb containing a liquid having a vapor pressure which rises rapidly upon elevation of temperature.

When the thermostatic by-pass is secured in the system as indicated in Fig. 1, the valve part 72 is normally closed so that the pressure in the oil lubricating system remains at its normal level during operation of the engine. If the temperature of the cooling fluid rises to a point sufficient to raise the vapor pressure of the liquid within bulb 65 so that the pressure therein overcomes the pressure exerted on valve 72 by the spring 74, the valve is opened, allowing the oil to be by-passed back to the crank case. This causes a drop in pressure in the system at 27 and operates the pressure-responsive device 24 in the manner above described.

After the cause of the abnormal condition is discovered and steps taken to eliminate it, the engine may be started. During the start the control may be reset by lifting dog 40ᶜ on its pivot so that the end 40ᵃ abuts face 31 and draws out the shaft 40. Spring 53 maintains latch 49 against abutment 47 and causes the lower end 49ᵃ of the latch to engage shoulder 54 on control rod 23, when cap 56 is pressed inwardly to move the rod into latch-engaging position. When normal pressure has been built up, the dog 40ᶜ is released so that it assumes the position indicated in Figs. 1 and 4.

In the embodiment illustrated in Fig. 2, I have shown how a control system embodying the invention may be used to throw the throttle or governor lever of an engine to the "stop" position. A pressure-responsive device 24ᵃ similar to that previously described may be mounted on support 81 suitably fixed to bracket 82 secured to engine 80 or to any suitable supporting structure. The pressure system may include line 83, taken from a high pressure point in the lubricating oil system as at 84, T-fitting 85 to which device 24ᵃ is connected, line 86, temperature-responsive by-pass valve 61ᵃ, line 87 and bushing 88. By-pass valve 61ᵃ may be identical with that shown in Fig. 3 and may be connected into the cooling fluid circulation system in the same manner as is shown in Fig. 1. Control rod 23ᵃ may be connected through pivoted member 89 to connecting rod 90, in turn connected to throttle lever 91 of the engine through turnbuckle 92. A spring 93 may be connected between bracket 94 on support 81 and bracket 95 on rod 90. Movement of the throttle to "run" position is thus resisted by spring 93. The position of lever 91 is regulated by the adjustment of turnbuckle 92. A button 96 may be secured to the end of the shaft corresponding to 40 in Fig. 4.

In operation, the latch within device 24ᵃ is disengaged from control rod 23ᵃ in the manner described in connection with Figs. 1, 4 and 5, thus releasing the rod and causing it and rod 90 to move in the direction of the arrow under the force of spring 93. This brings the throttle lever 91 to "stop" position. The device may be reset during starting by holding lever 91 in the "run" position until the lubricating oil pressure builds up to the required point for resetting the latch, after which lever 91 may be released and will be held mechanically in "run" position.

In Fig. 6 I have shown how the control may be utilized to sound an alarm in the event that abnormal conditions are reached in the lubricating system, or in any auxiliary system that may affect the pressure therein through one or more by-pass valves connected therein in the manner described. A howler 100 and a light 101 are connected in series across mains 102 and 103 as indicated, the light being of sufficient resistance that the howler is not energized under normal conditions. The pressure-responsive device 24ˣ is preferably housed within a water-tight casing 30ˣ, constructed along the lines of that illustrated in Figs. 4 and 5. The device carries a shaft 40ˣ slidably mounted in member 41ˣ similar to that described in Figs. 4 and 5. The other end of shaft 40ˣ is slidably mounted in hub 104. A contact 105 on insulating collar 106 is mounted on shaft 40ˣ, arranged to coact with fixed contact 107.

When the engine is operating under normal conditions, the light 101 is lighted so that it may be viewed by the attendant through glass 108. When abnormal conditions arise in the system due to a decrease of pressure occurring therein for any reason, shaft 40ˣ moves in the direction of the arrow and contact 105 engages contact 107, thereby short-circuiting the light 101. This causes an increase in current in the howler circuit and energizes the latter, thereby warning the attendant of an abnormal or dangerous condition.

It should be understood that the embodiments above described are illustrative merely and do not limit the invention. One or more by-pass valves may be provided within the pressure system, each operable mechanically upon the occurrence of a predetermined condition, either in the auxiliary systems of the engine or in another engine, such as overspeed, underspeed or other condition. While it is preferable to provide a separate valve operable on the occurrence of a single condition, a valve operable upon the occurrence of any one of a number of conditions may be provided. Whatever the condition to which the valve is responsive, however, it is highly desirable that it be arranged so as directly to affect the valve and positively to produce a movement opening the valve, thereby effecting an immediate response in the pressure-responsive system. In the case of a temperature-responsive by-pass valve, it is desirable to fill a bulb, such as that shown at 65, with an expansible liquid or one characterized by a rapid rise in vapor pressure on increase of temperature, in order to ensure this action.

In order to ensure positive operation it is also desirable to protect the operating parts of the valve structure against external influences. For this purpose, casing 61 and fitting 79ᵃ, as well as the moving parts therein contained, should be made of sturdy, rustless metal such as brass or bronze, and precautions taken against the breakdown of said parts.

In the event that it is desired to shut down the engine on the occurrence of the undesirable conditions, it is not essential that the fuel pump rack be moved to close the injection valves or that the throttle or governor be moved to "stop" position. For instance, a butterfly valve in the air intake of the engine may be closed by the mechanical movement produced by the pressure-responsive device, or suitable fingers may be provided on a supporting member adapted to be raised by a cam movement to lift the exhaust valves of the engine from their seats, thus preventing compression within the cylinders and causing the engine to stop. These and other modifications will readily be apparent to persons skilled in the art and may be made without departing from the spirit of the invention.

Having thus described my invention, what I claim is:

1. In combination with an internal combustion engine having a pressure lubrication system and a pressure-responsive device therewithin, a mechanically operated by-pass valve in such system, said valve being normally closed during the operation of the engine but being adapted to be opened to by-pass lubricating oil from the pressure system to the crank case of the engine and thereby to lower the pressure and actuate said pressure-responsive means.

2. In an oil pressure system for internal combustion engines, a line leading from a high pressure point in said system to a low pressure point thereof, a pressure-responsive device and a normally closed valve in said line, said valve being adapted and arranged to open directly upon the occurrence of a predetermined condition extrinsic of those in the said pressure system whereby the oil therein is by-passed to the low pressure point thereof and the pressure-responsive device is actuated.

3. In an oil pressure system for internal combustion engines containing within it a pressure-responsive device, a normally closed valve in said system, said valve being mechanically operated and being adapted and arranged to be opened directly upon the occurrence of one of a number of predetermined conditions extrinsic of said system and thereby to reduce the pressure therein and actuate said pressure-responsive device.

4. A control for internal combustion engines having a pressure lubrication system, said control comprising a pressure-responsive device and a normally closed, mechanically operated by-pass valve within such system, said by-pass valve being adapted and arranged to operate directly upon the occurrence of a predetermined condition and thereby to actuate the pressure-responsive device.

5. A control for Diesel engines comprising in combination a pressure lubrication system, a pressure-responsive device and a valve therein, said valve including a spring holding it closed under normal conditions, said valve being operable to open against the force of such spring directly upon the occurrence of a predetermined condition and thereby to actuate the said pressure-responsive device.

ALAN C. DAVIS.